(12) United States Patent
Tanaka

(10) Patent No.: US 8,089,483 B2
(45) Date of Patent: Jan. 3, 2012

(54) GAME MACHINE, GAME MACHINE CONTROL METHOD, AND INFORMATION STORAGE MEDIUM

(75) Inventor: Toshiyuki Tanaka, Saitama (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 796 days.

(21) Appl. No.: 12/159,606

(22) PCT Filed: Nov. 2, 2006

(86) PCT No.: PCT/JP2006/322002
§ 371 (c)(1),
(2), (4) Date: Jun. 27, 2008

(87) PCT Pub. No.: WO2007/077670
PCT Pub. Date: Jul. 12, 2007

(65) Prior Publication Data
US 2009/0135184 A1    May 28, 2009

(30) Foreign Application Priority Data

Dec. 28, 2005    (JP) .................................. 2005-379909

(51) Int. Cl.
G06T 11/00    (2006.01)
G09G 5/00    (2006.01)

(52) U.S. Cl. ...................................... 345/472; 345/660

(58) Field of Classification Search ............. 340/995.11; 463/30, 32, 33, 43, 44; 345/473; 715/782
See application file for complete search history.

(56) References Cited

U.S. PATENT DOCUMENTS 6,050,896 A * 4/2000 Hanado et al. .................. 463/32
6,128,018 A    10/2000 Nakajima
(Continued)

FOREIGN PATENT DOCUMENTS

EP    0778547 A1    6/1997
(Continued)

OTHER PUBLICATIONS

Supplementary European Search Report dated Oct. 20, 2009.

*Primary Examiner* — Kee M Tung
*Assistant Examiner* — Weiming He
(74) *Attorney, Agent, or Firm* — Sughrue Mion, PLLC

(57) ABSTRACT

Provided is a game machine for realizing, by relatively simple processing, an execution of predetermined game processing based on how a region of interest in a virtual three-dimensional space is displayed on a game screen (such as the size, or the position within the game screen). The present invention relates to a game machine which generates a game screen showing a scene of the three-dimensional space viewed from a given viewpoint by transforming coordinates of an object placed in the virtual three-dimensional space into a screen coordinate system by using a predetermined coordinate transformation calculation. A reference point storage unit (56) stores coordinate values of one or more reference points set in relation to the region of interest within the virtual three-dimensional space. A coordinate value acquiring unit (58) transforms the coordinate values of the one or more reference points into the screen coordinate system by using the predetermined coordinate transformation calculation, and acquires the coordinate values in the screen coordinate system of the one or more reference points. A game processing executing unit (62) executes the predetermined game processing based on the coordinate values acquired by the coordinate value acquiring unit (58).

10 Claims, 10 Drawing Sheets

U.S. PATENT DOCUMENTS

| | | | |
|---|---|---|---|
| 6,835,136 B2* | 12/2004 | Kitao | 463/33 |
| 2002/0022515 A1 | 2/2002 | Boku et al. | |
| 2002/0115483 A1 | 8/2002 | Fujiwara et al. | |
| 2004/0142746 A1* | 7/2004 | Hinami et al. | 463/32 |
| 2004/0165010 A1* | 8/2004 | Robertson et al. | 345/805 |
| 2005/0020363 A1 | 1/2005 | Kawamoto et al. | |
| 2005/0193349 A1* | 9/2005 | Sato et al. | 715/782 |

FOREIGN PATENT DOCUMENTS

| | | |
|---|---|---|
| JP | 2000-157738 A | 6/2000 |
| JP | 2001-351123 A | 12/2001 |
| JP | 2002-163676 A | 6/2002 |
| JP | 2005-40347 A | 2/2005 |
| JP | 2005-342120 A | 12/2005 |

* cited by examiner

| ID | INSIDE-SCREEN JUDGMENT REFERENCE POINT |
|----|----------------------------------------|
| 1 | (XWa, YWa, ZWa) |
| 2 | (XWb, YWb, ZWb) |
| 3 | (XWc, YWc, ZWc) |
| 4 | (XWd, YWd, ZWd) |

| ID | OUTSIDE-SCREEN JUDGMENT REFERENCE POINT |
|----|-----------------------------------------|
| 1 | (XWe, YWe, ZWe) |
| 2 | (XWf, YWf, ZWf) |
| 3 | (XWg, YWg, ZWg) |
| 4 | (XWh, YWh, ZWh) |

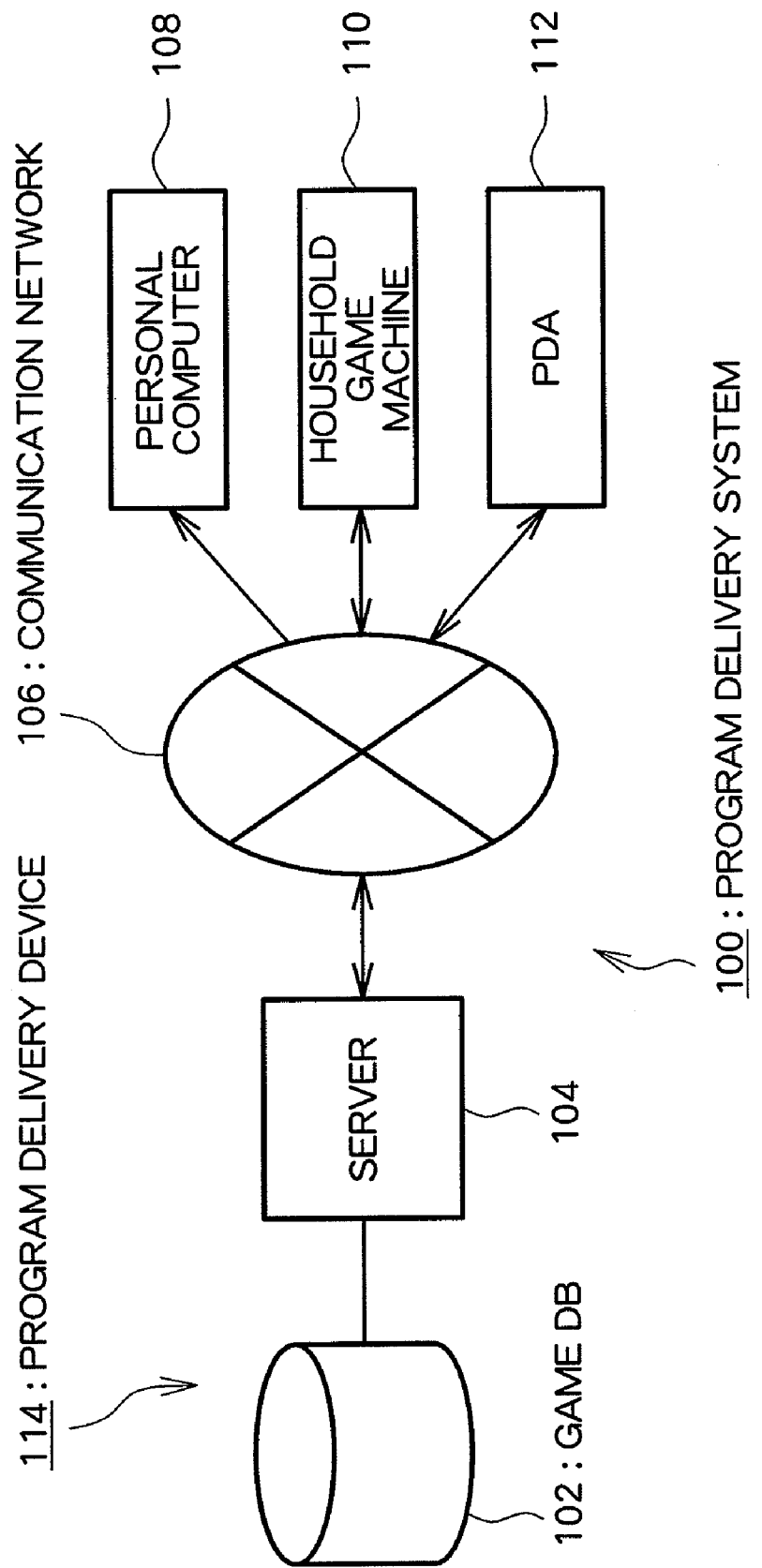

GAME MACHINE, GAME MACHINE CONTROL METHOD, AND INFORMATION STORAGE MEDIUM

TECHNICAL FIELD

The present invention relates to a game machine, a game machine control method, and an information storage medium.

BACKGROUND ART

There is known a game machine which displays a game screen showing a scene of a virtual three-dimensional space viewed from a given viewpoint. For example, there is known a soccer game machine which displays a game screen showing a picture obtained by viewing, from a given viewpoint, a virtual three-dimensional space in which a field object representing a soccer field, a goal object representing a goal, a player object representing a soccer player, a ball object representing a soccer ball, a stand object representing the spectator stands, and a spectator object representing a spectator are placed.

Patent Document 1: JP 2005-342120 A

DISCLOSURE OF THE INVENTION

Problems to be Solved by the Invention

In such a game machine as described above, there is a case where it is wished to execute predetermined game processing based on how a predetermined region (region of interest) in the virtual three-dimensional space is displayed on a game screen (for example, the size, the position within the game screen, or the like). For example, in a soccer game machine, there is a case where an output of a play-by-play voice such as "We see enthusiastic spectators." is wished when a region (region of interest) in which a spectator object group representing enthusiastic spectators is placed is zoomed in within a game screen. However, to achieve such an effect, complicated processing must be executed.

The present invention has been made in view of the above-mentioned problem, and an object thereof is to provide: a game machine, a game machine control method, and an information storage medium for realizing execution of predetermined game processing based on how a region of interest within a virtual three-dimensional space is displayed on a game screen (for example, the size, the position within the game screen, or the like) by relatively simple processing.

Means for Solving the Problem

In order to solve the above-mentioned problem, a game machine according to the present invention, which generates and displays a game screen showing a scene of a virtual three-dimensional space viewed from a given viewpoint by transforming coordinates of an object placed in the virtual three-dimensional space into a screen coordinate system by using a predetermined coordinate transformation calculation, comprises: reference point storage means for storing coordinate values within the virtual three-dimensional space of one or more reference points set in relation to a region of interest within the virtual three-dimensional space; acquiring means for acquiring coordinate values in the screen coordinate system of the one or more reference points by transforming the coordinate values of the one or more reference points stored in the reference point storage means into the screen coordinate system by using the predetermined coordinate transformation calculation; and game processing executing means for executing predetermined game processing based on the coordinate values acquired by the acquiring means.

Further, a control method for a game machine according to the present invention, which generates and displays a game screen showing a scene of a virtual three-dimensional space viewed from a given viewpoint by transforming coordinates of an object placed in the virtual three-dimensional space into a screen coordinate system by using a predetermined coordinate transformation calculation, comprises: an acquiring step of acquiring coordinate values in the screen coordinate system of one or more reference points by transforming the coordinate values of the one or more reference points stored in reference point storage means into the screen coordinate system by using the predetermined coordinate transformation calculation, the reference point storage means being configured to store coordinate values within the virtual three-dimensional space of the one or more reference points set in relation to a region of interest within the virtual three-dimensional space; and a game processing executing step of executing predetermined game processing based on the coordinate values acquired in the acquiring step.

A program according to the present invention causes a computer such as a household game machine, a portable game machine, an arcade game machine, a mobile phone, a personal digital assistant (PDA), and a personal computer to function as a game machine which generates and displays a game screen showing a scene of a virtual three-dimensional space viewed from a given viewpoint by transforming coordinates of an object placed in the virtual three-dimensional space into those in a screen coordinate system by using a predetermined coordinate transformation calculation. The program further causes the computer to function as: reference point storage means for storing coordinate values within the virtual three-dimensional space of one or more reference points set in relation to a region of interest within the virtual three-dimensional space; acquiring means for acquiring coordinate values in the screen coordinate system of the one or more reference points by transforming the coordinate values of the one or more reference points stored in the reference point storage means into the screen coordinate system by using the predetermined coordinate transformation calculation; and game processing executing means for executing predetermined game processing based on the coordinate values acquired by the acquiring means.

Further, an information storage medium according to the present invention is a computer-readable information storage medium recorded with the above-mentioned program. Further, a program delivery device according to the present invention is a program delivery device that includes an information storage medium recorded with the above-mentioned program, reads out the above-mentioned program from the information storage medium and delivers the above-mentioned program. Further, a program delivery method according to the present invention is a program delivery method for, while using an information storage medium recorded with the above-mentioned program, reading out the above-mentioned program from the information storage medium and delivering the above-mentioned program.

The present invention relates to a game machine which generates and displays a game screen showing a scene of a virtual three-dimensional space viewed from a given viewpoint by transforming coordinates of an object placed in the virtual three-dimensional space into a screen coordinate system by using a predetermined coordinate transformation calculation. In the present invention, coordinate values within the virtual three-dimensional space of one or more reference points set in relation to a region of interest within the virtual three-dimensional space are stored. The coordinate values of the one or more reference points are transformed into the screen coordinate system by use of the predetermined coordinate transformation calculation, so coordinate values in the screen coordinate system of the one or more reference points are acquired. Based on the acquired coordinate values, predetermined game processing is executed. According to the present invention, it is possible to realize, with relatively simple processing, execution of predetermined game processing based on how a region of interest within a virtual three-dimensional space is displayed on a game screen (for example, the size, the position within the game screen, or the like).

Further, according to one aspect of the present invention, judging means for judging whether or not the coordinate values in the screen coordinate system of at least one of the reference points are included in a predetermined region in the screen coordinate system may be further included, and the game processing executing means may execute the predetermined game processing based on a judgment result of the judging means. Herein, the "predetermined region in the screen coordinate system" represents, for example, a game screen display subject region (region to be displayed on the game screen), a partial region of the game screen display subject region, a region outside the game screen display subject region, or the like in the screen coordinate system. With this configuration, by setting the one or more reference points so that at least one of the reference points are included in a predetermined region in the screen coordinate system only in a case where the region of interest within the virtual three-dimensional space is displayed on the game screen in a given mode (for example, size, display position, and the like), the judgment as to whether or not the region of interest within the virtual three-dimensional space is displayed on the game screen in the given mode can be realized by relatively simple processing of judging whether or not at least one of the reference points are included in a predetermined region in the screen coordinate system.

Further, according to another aspect of the present invention, the reference point storage means may store coordinate values within the virtual three-dimensional space of one or more first reference points set in relation to the region of interest within the virtual three-dimensional space and of one or more second reference points set in relation to the region of interest within the virtual three-dimensional space, the acquiring means may acquire coordinate values in the screen coordinate system of the first reference points and the second reference points by transforming the coordinate values of the first reference points and the second reference points stored in the reference point storage means into the coordinate values in the screen coordinate system by using the predetermined coordinate transformation calculation, and the judging means may judge whether or not the coordinate values in the screen coordinate system of at least one of the first reference points are included in the predetermined region and the coordinate values in the screen coordinate system of at least one of the second reference points are included in a region outside the predetermined region. In this aspect, the first reference points are set so that, for example, the coordinate values in the screen coordinate system of at least one of the first reference points are included in a predetermined region in the screen coordinate system only in a case where the region of interest within the virtual three-dimensional space is displayed on the game screen in a size equal to or smaller than a given maximum size. Meanwhile, the second reference points are set so that, for example, the coordinate values in the screen coordinate system of at least one of the second reference points are included in a region outside the predetermined region in the screen coordinate system only in a case where the region of interest within the virtual three-dimensional space is displayed on the game screen in a size equal to or larger than a given minimum size. With this configuration, the judgment as to whether or not the region of interest within the virtual three-dimensional space is displayed on the game screen in a size equal to or larger than the given minimum size and equal to or smaller than the given maximum size (in other words, a size within a given size range) can be realized by relatively simple processing of judging whether or not at least one of the first reference points is included in the predetermined region in the screen coordinate system and at least one of the second reference points is included in the region outside the predetermined region in the screen coordinate system.

BRIEF DESCRIPTION OF THE DRAWINGS

FIG. 11 is a diagram showing an entire configuration of a program delivery system according to another embodiment of the present invention.

BEST MODE FOR CARRYING OUT THE INVENTION

Hereinafter, detailed description will be given of an example of an embodiment of the present invention with reference to the drawings.

Figure 1:
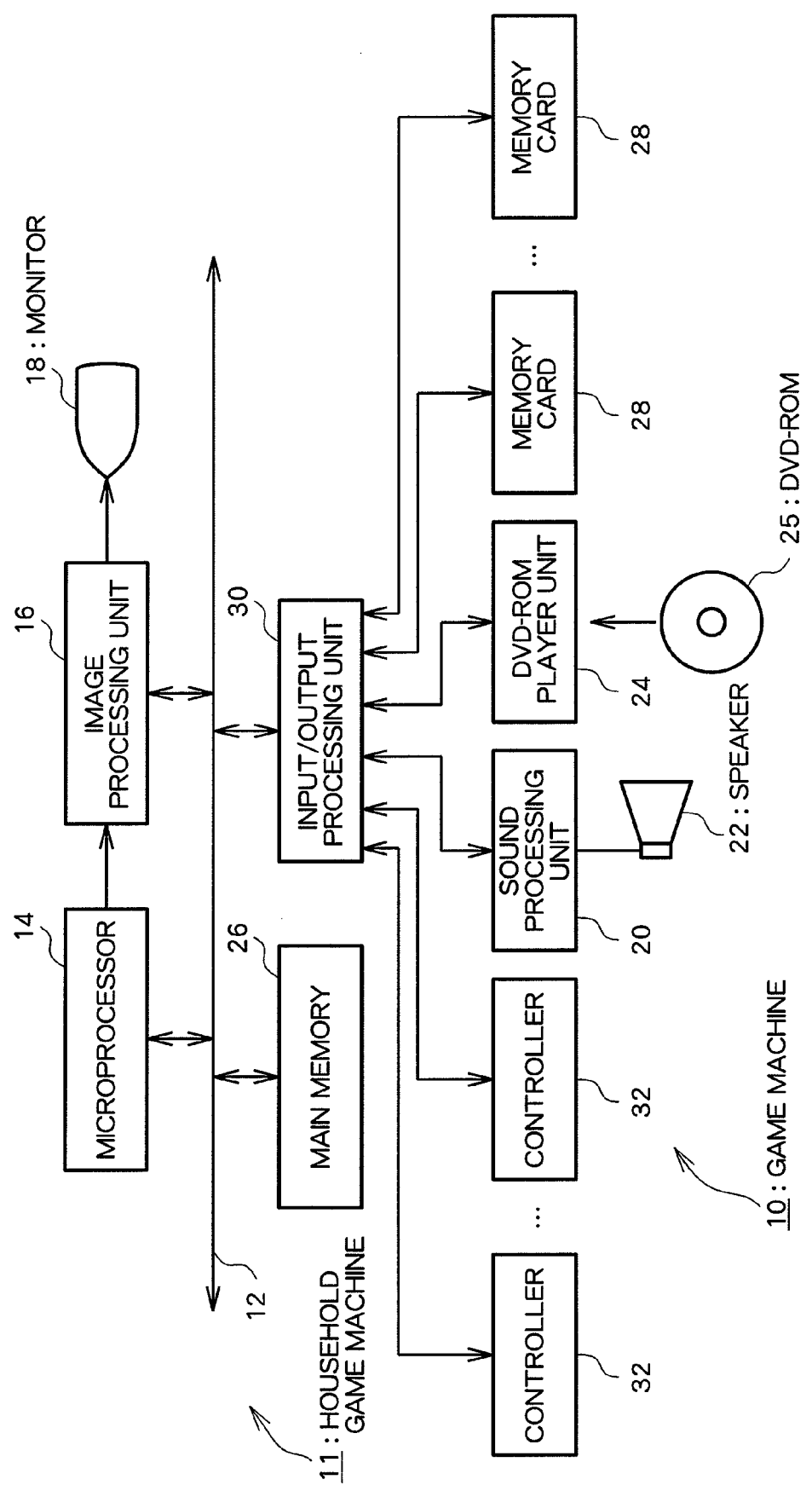
FIG. 1 is a diagram showing a hardware configuration of a game machine according to this embodiment.

FIG. 1 is a diagram showing a configuration of a game machine according to the embodiment of the present invention. A game machine 10 shown in the figure has a structure in which a household game machine 11 is fitted with a DVD-ROM 25 and a memory card 28 that serve as information storage media and also connected with a monitor 18 and a speaker 22. For example, a household television set is used as the monitor 18, and an internal speaker thereof is used as the speaker 22.

The household game machine 11 is a known computer game system configured by including a bus 12, a microprocessor 14, an image processing unit 16, a sound processing unit 20, a DVD-ROM player unit 24, a main memory 26, an input/output processing unit 30, and a controller 32. The components except the controller 32 are housed in a casing.

The bus 12 is used for exchanging an address and data between the respective components of the household game machine 11. The microprocessor 14, the image processing unit 16, the main memory 26, and the input/output processing unit 30 are interconnected via the bus 12 so as to allow data communication.

The microprocessor 14 controls the respective components of the household game machine 11 based on an operating system stored in a ROM (not shown), a program read out from the DVD-ROM 25, and data read out from the memory card 28. The main memory 26 includes, for example, a RAM, and the program read out from the DVD-ROM 25 and the data read out from the memory card 28 are written to the main memory 26 as necessary. The main memory 26 is also used as a work memory for the microprocessor 14.

The image processing unit 16 includes a VRAM, and renders a game screen in the VRAM based on image data sent from the microprocessor 14. Then, the image processing unit 16 converts content thereof into a video signal and outputs the video signal to the monitor 18 at a predetermined timing.

The input/output processing unit 30 is an interface used for the microprocessor 14 to access the sound processing unit 20, the DVD-ROM player unit 24, the memory card 28, and the controller 32. The sound processing unit 20, the DVD-ROM player unit 24, the memory card 28, and the controller 32 are connected to the input/output processing unit 30.

The sound processing unit 20 includes a sound buffer, and reproduces and outputs, from the speaker 22, various sound data such as game music, game sound effects, and messages that are read out from the DVD-ROM 25 and stored in the sound buffer.

The DVD-ROM player unit 24 reads a program recorded on the DVD-ROM 25 according to an instruction from the microprocessor 14. Note that the DVD-ROM 25 is used herein for supplying the program to the household game machine 11. However, any other information storage media such as a CD-ROM and a ROM card may also be used. Alternatively, the program may also be supplied to the household game machine 11 from a remote area via a data communication network such as the Internet.

The memory card 28 includes a nonvolatile memory (for example, an EEPROM). The household game machine 11 has a plurality of memory card slots for insertion of the memory cards 28 so that a plurality of memory cards 28 can be simultaneously inserted. The memory card 28 is structured so that the memory card 28 can be inserted into and removed from the memory card slot, and is used for storing various game data such as saved data.

The controller 32 is general-purpose operation input means used for a player to input various game operations. The input/output processing unit 30 scans states of respective portions of the controller 32 every predetermined period (for example, 1/60 seconds), and transfers operation signals representing scanned results to the microprocessor 14 via the bus 12. The microprocessor 14 judges a game operation performed by the player based on the operation signals. The household game machine 11 is structured to be connectable to a plurality of controllers 32, and the microprocessor 14 performs the game control based on the operation signals inputted from the respective controllers 32.

The game machine 10 having the above-mentioned configuration provides a soccer game by execution of a soccer game program read out from the DVD-ROM 25.

Figure 2:
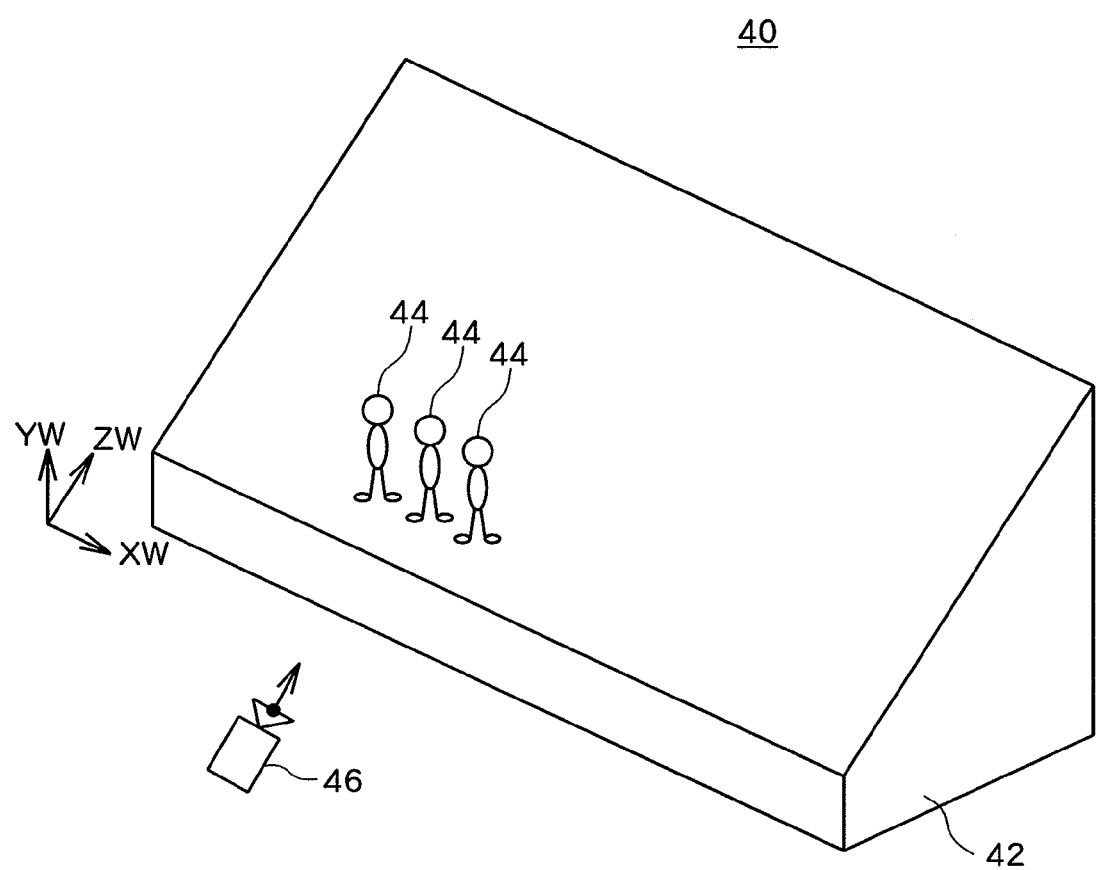
FIG. 2 is a diagram showing an example of a virtual three-dimensional space.

On the game machine 10, a virtual three-dimensional space (game space) is built in the main memory 26 in order to provide the above-mentioned soccer game. A field object representing a soccer field, a goal object representing a goal, a player object representing a soccer player, a ball object representing a soccer ball, a stand object representing the spectator stands, and a spectator object representing a spectator are placed in the virtual three-dimensional space, thereby forming a soccer match venue. FIG. 2 shows a part of the virtual three-dimensional space built in the main memory 26. Such a stand object 42 and a spectator object 44 as shown in the figure are located in a virtual three-dimensional space 40.

In addition, a virtual camera 46 (viewpoint) is set in the virtual three-dimensional space 40. The game screen displayed on the monitor 18 shows a picture obtained by viewing, from the virtual camera 46, the virtual three-dimensional space 40. The player operates the controller 32 while watching the game screen to perform, for example, an action instruction with respect to an operation subject player object.

In this embodiment, it is judged whether or not a specific region (region of interest) in the virtual three-dimensional space 40 is displayed on the game screen in a predetermined state (for example, the size, the position within the game screen, or the like). Based on the judgment result, predetermined game processing is executed. To be more specific, when specific spectator objects 44 (for example, spectator objects representing enthusiastic spectators) are zoomed into a moderate size on the game screen, a predetermined play-by-play voice (voice that tells that, for example, there are enthusiastic supporters) is outputted. Particularly in this embodiment, such an effect can be achieved by relatively simple processing.

Figure 3:
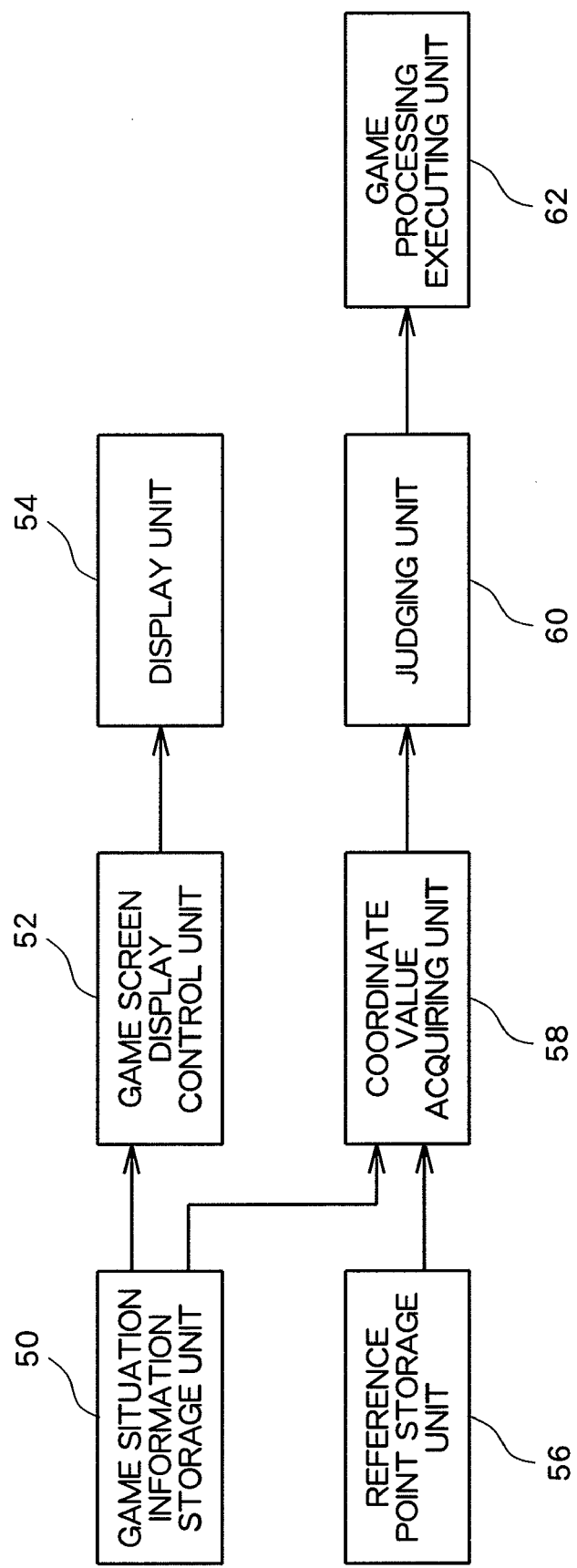
FIG. 3 is a functional block diagram of the game machine according to this embodiment.

Hereinafter, description will be made of a configuration for realizing, with relatively simple processing, the execution of predetermined game processing based on how the specific region (region of interest) in the virtual three-dimensional space 40 is displayed on the game screen. FIG. 3 is a functional block diagram mainly showing functions implemented on the game machine 10, which relate to the present invention. As shown in the figure, the game machine 10 functionally includes a game situation information storage unit 50, a game screen display control unit 52, a display unit 54, a reference point storage unit 56, a coordinate value acquiring unit 58, a judging unit 60, and a game processing executing unit 62. Those functions are implemented by the microprocessor 14 executing a program read out from the DVD-ROM 25.

(Game Situation Information Storage Unit)

The game situation information storage unit 50 is implemented mainly by the main memory 26. The game situation information storage unit 50 stores game situation information that indicates the situation of a game. The game situation information includes information indicating, for example, states (such as a position and a posture) of each of objects such as the player object and the ball object located in the virtual three-dimensional space 40. For example, the game situation information includes information indicating the position of each of the objects in the virtual three-dimensional space 40 by using the coordinate values in a world coordinate system (XW, YW, ZW). The game situation information also includes, for example, information indicating the position (viewpoint position) and the posture (viewing direction) of the virtual camera 46. The game situation information is updated based on, for example, the operation content of the controller 32.

(Game Screen Display Control Unit and Display Unit)

The game screen display control unit 52 is implemented mainly by the microprocessor 14 and the image processing unit 16. The display unit 54 is implemented mainly by the monitor 18. The game screen display control unit 52 generates the game screen showing a scene of the virtual three-dimensional space 40 viewed from the virtual camera 46. To generate the game screen, the game screen display control unit 52 transforms, by using a predetermined coordinate transformation calculation, the coordinate values (coordinate values in the virtual three-dimensional space 40) of each of vertices of each object that is placed in the virtual three-dimensional space 40 based on the storage content of the game situation information storage unit 50 into those in the screen coordinate system. The display unit 54 displays the game screen generated by the game screen display control unit 52.

(Reference Point Storage Unit)

The reference point storage unit 56 is implemented mainly by the DVD-ROM 25 and/or the main memory 26. The reference point storage unit 56 stores the coordinate values in the virtual three-dimensional space 40 (coordinate values in the world coordinate system) of one or more reference points set in relation to a region of interest within the virtual three-dimensional space 40. The reference point is used for judging, for example, whether or not the region of interest within the virtual three-dimensional space 40 is displayed on the game screen in a given display mode (for example, the size and the position within the game screen). Details thereof will be described later.

Figures 4, 5:
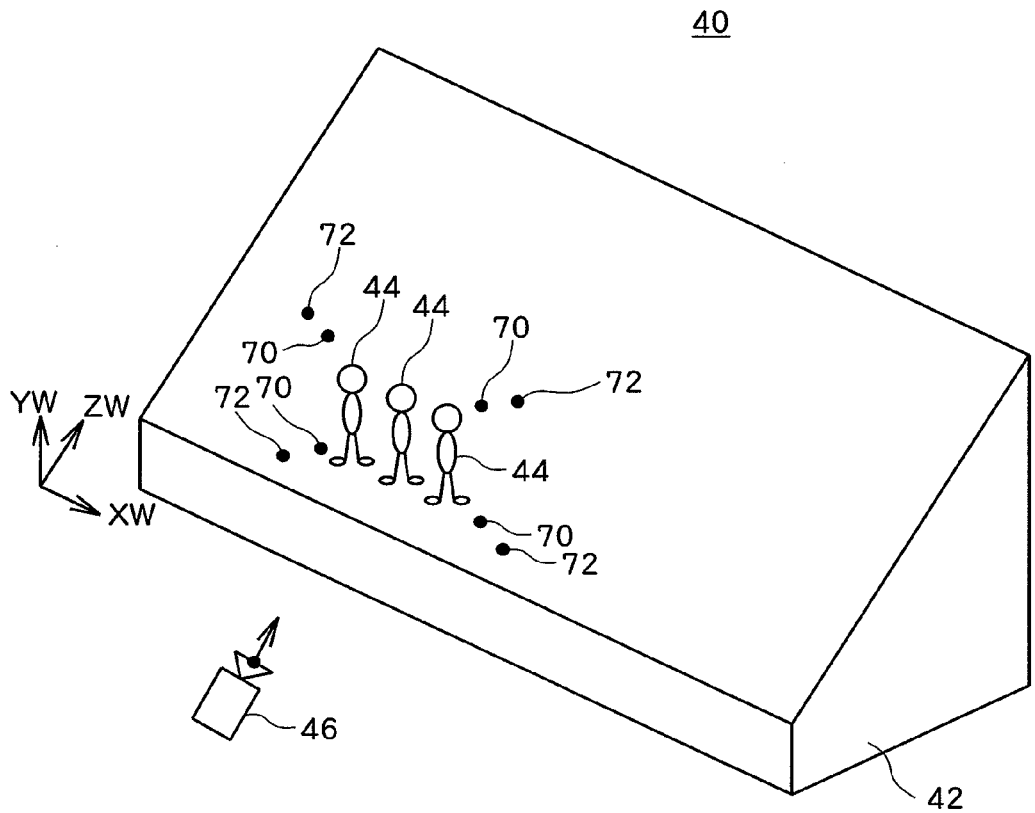
FIG. 4 is a diagram showing examples of inside-screen judgment reference points and outside-screen judgment reference points.
FIG. 5 is a diagram showing an example of a storage content of a reference point storage unit.

In the case of this embodiment, 2 kinds of reference points are set in relation to the region of interest within the virtual three-dimensional space 40. In other words, one or more inside-screen judgment reference points (first reference points) and one or more outside-screen judgment reference points (second reference points) are set in relation to the region of interest of the virtual three-dimensional space 40. FIG. 4 shows an example of the inside-screen judgment reference points and the outside-screen judgment reference points set in relation to the region of interest of the virtual three-dimensional space 40. In the example of the figure, the inside-screen judgment reference points 70 and the outside-screen judgment reference points 72 are set with a region in which 3 spectator objects 44 are placed being set as the region of interest. In the example of the figure, the inside-screen judgment reference points 70 are set around the region of interest so as to surround the region of interest. The outside-screen judgment reference points 72 are set outside the region surrounded by the inside-screen judgment reference points 70 so as to surround the region of interest.

In the case of this embodiment, the reference point storage unit 56 stores the coordinate values in the virtual three-dimensional space 40 of one or more inside-screen judgment reference points 70 and the coordinate values in the virtual three-dimensional space 40 of one or more outside-screen judgment reference points 72. FIG. 5 shows an example of the storage content of the reference point storage unit 56.

(Coordinate Value Acquiring Unit)

The coordinate value acquiring unit 58 (acquiring means) is implemented mainly by the microprocessor 14. The coordinate value acquiring unit 58 transforms the coordinate values of the reference point stored in the reference point storage unit 56 into those in the screen coordinate system to thereby acquire the coordinate values in the screen coordinate system of the reference point. At this time, the coordinate transformation calculation used by the game screen display control unit 52 in generating the game screen is used. In the case of this embodiment, the coordinate value acquiring unit 58 acquires the coordinate values in the screen coordinate system of the inside-screen judgment reference points 70 and the outside-screen judgment reference points 72.

(Judging Unit)

The judging unit 60 is implemented mainly by the microprocessor 14. The judging unit 60 judges whether or not the coordinate values in the screen coordinate system of at least one reference point acquired by the coordinate value acquiring unit 58 is included in a predetermined region in the screen coordinate system. The "predetermined region in the screen coordinate system" represents, for example, the game screen display subject region (region displayed on the game screen), a partial region of the game screen display subject region, a region outside the game screen display subject region, or the like in the screen coordinate system.

Figure 6:
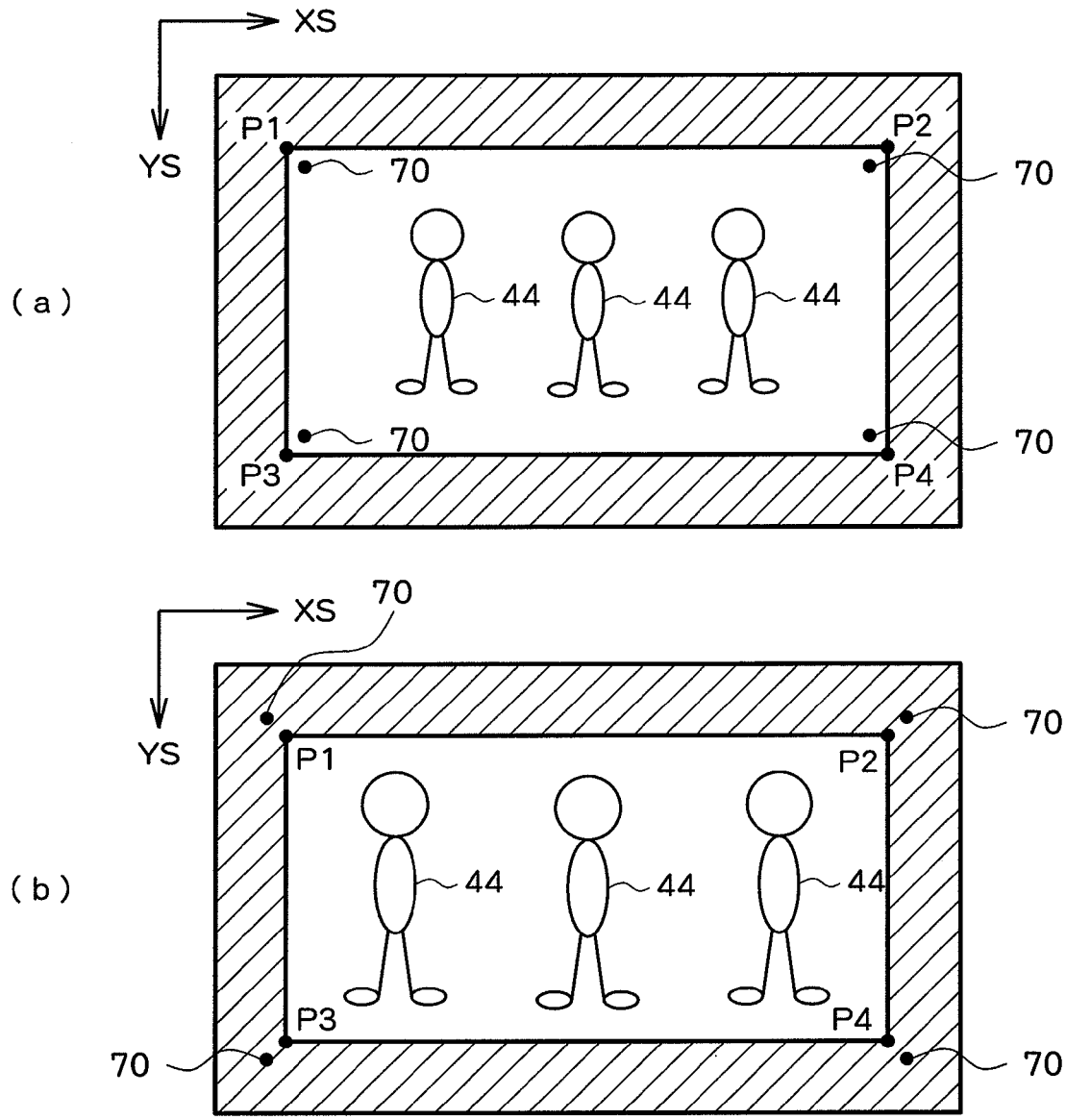
FIG. 6 is diagram showing a relationship between a region of interest within the virtual three-dimensional space whose coordinates are transformed into those in a screen coordinate system and the inside-screen judgment reference points whose coordinates are transformed into those in the screen coordinate system.
Figure 7:
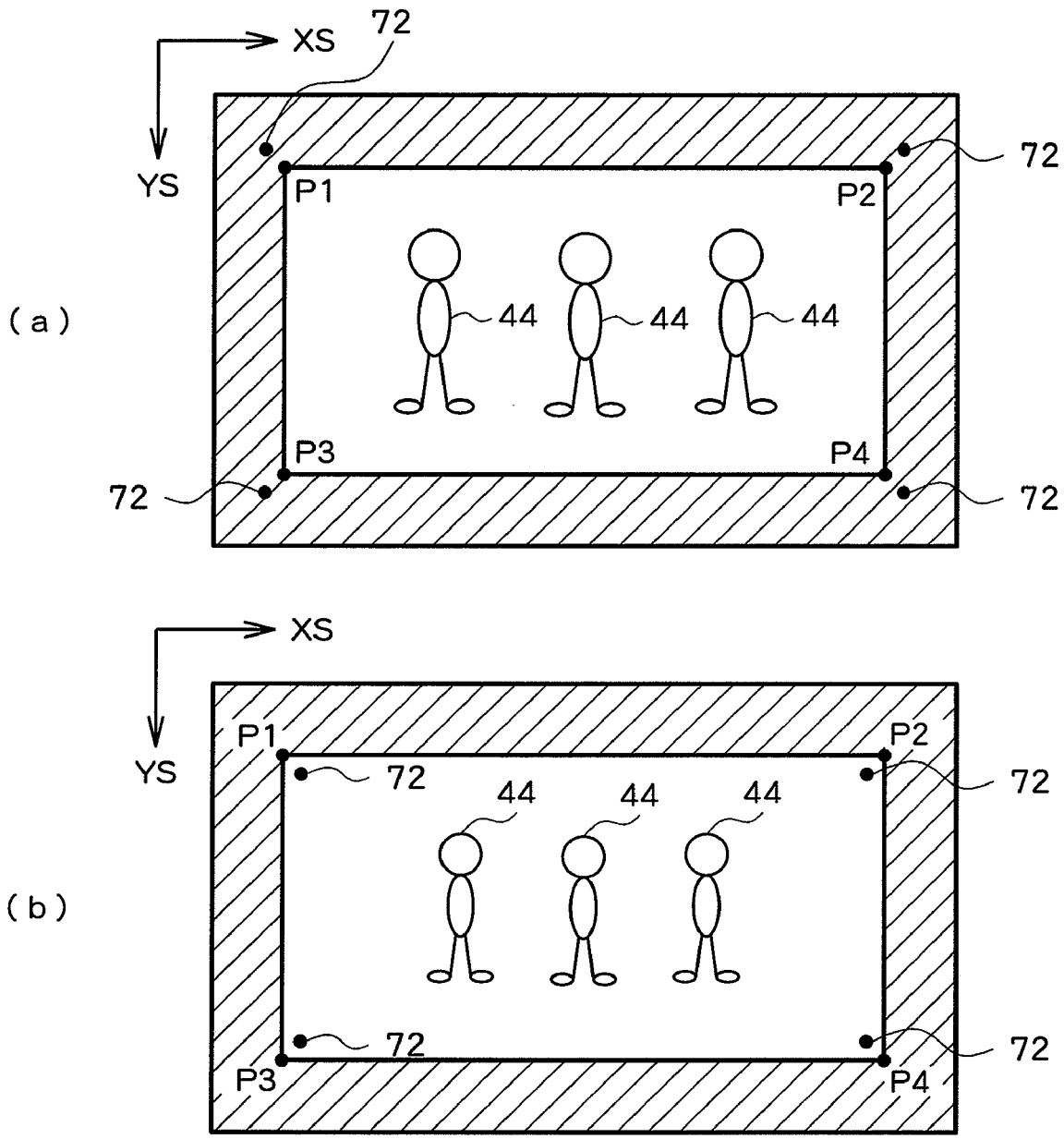
FIG. 7 is diagram showing a relationship between the region of interest within the virtual three-dimensional space whose coordinates are transformed into those in the screen coordinate system and the outside-screen judgment reference points whose coordinates are transformed into those in the screen coordinate system.
Figure 8:
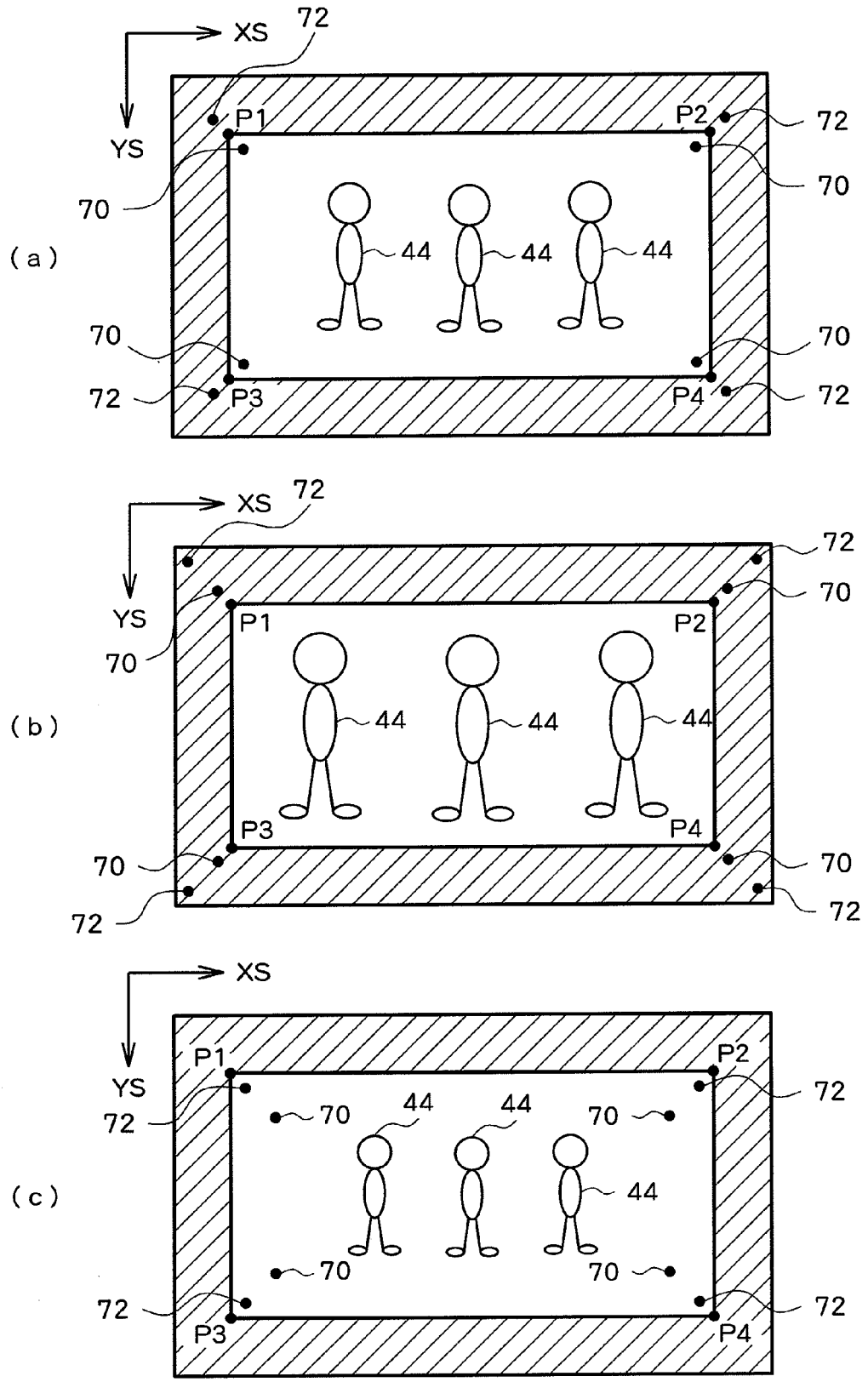
FIG. 8 is diagram showing a relationship between the region of interest within the virtual three-dimensional space whose coordinates are transformed into those in the screen coordinate system and the inside-screen judgment reference points and outside-screen judgment reference points whose coordinates are transformed into those in the screen coordinate system.

Herein, detailed description will be given of the setting of the reference points (inside-screen judgment reference points 70 and outside-screen judgment reference points 72) and the operation of the judging unit 60. FIGS. 6 to 8 are diagrams for showing relationships between the spectator objects 44 (region of interest) whose coordinates are transformed into those in the screen coordinate system (XS, YS) and the inside-screen judgment reference points 70 and outside-screen judgment reference points 72 whose coordinates are transformed into those in the screen coordinate system. Note that in this embodiment, a rectangle region (game screen display subject region) surrounded by 4 points in the screen coordinate system, P1 (XS0, YS0), P2 (XS0+W, YS0), P3 (XS0, YS0+H), and P4 (XS0+W, YS0+H), is displayed on the game screen. Note that the point P1 (XS0, YS0) is, for example, the origin (0, 0) in the screen coordinate system, and W and H are constants representing the width and height of the game screen, respectively. In FIGS. 6 to 8, portions that are not shaded show the game screen display subject regions.

For example, the judging unit 60 judges whether or not the coordinate values in the screen coordinate system of at least one of the inside-screen judgment reference points 70 (for example, all of the inside-screen judgment reference points 70, or a predetermined number or more or a predetermined percentage or more of the inside-screen judgment reference points 70) are included in the game screen display subject region.

For example, if a plurality of inside-screen judgment reference points 70 are set as shown in FIG. 4, as shown in FIG. 6, in a case where at least one of the inside-screen judgment reference points 70 whose coordinates are transformed into the screen coordinate system are included in the game screen display subject region (FIG. 6(a)), the region of interest (spectator objects 44) within the virtual three-dimensional space 40 is displayed on the game screen in a smaller size than in a case where all of the inside-screen judgment reference points 70 whose coordinates are transformed into those in the screen coordinate system are included in the region outside the game screen display subject region (shaded portion) (FIG. 6(b)).

Accordingly, to execute the predetermined game processing, based on a judgment result as to whether or not the region of interest within the virtual three-dimensional space 40 is displayed on the game screen in a size equal to or smaller than a given reference size, a plurality of inside-screen judgment reference points 70 may be set as follows. For example, the plurality of inside-screen judgment reference points 70 may be set so that the coordinate values in the screen coordinate system of at least one of the inside-screen judgment reference points 70 are included in the game screen display subject region in the case where the region of interest is displayed on the game screen in a size equal to or smaller than the reference size. This allows the judgment as to whether or not the region of interest is displayed on the game screen in a size equal to or smaller than the reference size by relatively simple processing of judging whether or not the coordinate values in the screen coordinate system of at least one of the inside-screen judgment reference points 70 are included in the game screen display subject region.

Note that the plurality of inside-screen judgment reference points 70 may be set so that the coordinate values in the screen coordinate system of all of the inside-screen judgment reference points 70 are included in the game screen display subject region in a case where the region of interest is displayed on the game screen in a size equal to or smaller than the reference size. Alternatively, the plurality of inside-screen judgment reference points 70 may be set so that the coordinate values in the screen coordinate system of a predetermined number or more or a predetermined percentage or more of the inside-screen judgment reference points 70 are included in the game screen display subject region in a case where the region of interest is displayed on the game screen in a size equal to or smaller than the reference size.

Further, in this case, the number and the positions of the inside-screen judgment reference points 70 are set in consideration of, for example, which direction the scene of the region of interest is to be viewed from so as to be displayed on the game screen. For example, whichever direction the scene of the region of interest is to be viewed from, in the case where the region of interest is displayed on the game screen in a size equal to or smaller than the reference size, the inside-screen judgment reference points 70 are set so that the coordinate values in the screen coordinate system of at least one of the inside-screen judgment reference points 70 are included in the game screen display subject region.

Note that there is a case where one inside-screen judgment reference point 70 suffices by being set in relation to the region of interest within the virtual three-dimensional space 40. For example, if the position and the posture of the virtual camera 46 are fixed so that a change in angle of view causes the region of interest displayed on the game screen to change in size, one inside-screen judgment reference point 70 may be set so that the coordinate values in the screen coordinate system of the inside-screen judgment reference point 70 is included in the game screen display subject region in a case where the region of interest is displayed on the game screen in a size equal to or smaller than a given reference size.

Further, for example, the judging unit 60 judges whether or not the coordinate values in the screen coordinate system of at least one of the outside-screen judgment reference points 72 (for example, all of the outside-screen judgment reference points 72, or a predetermined number or more or a predetermined percentage or more of the outside-screen judgment reference points 72) are included in the region outside the game screen display subject region.

For example, if a plurality of outside-screen judgment reference points 72 are set as shown in FIG. 4, as shown in FIG. 7, in a case where at least one of the outside-screen judgment reference points 72 whose coordinates are transformed into those in the screen coordinate system are included in the region outside the game screen display subject region (FIG. 7(*a*)), the region of interest (spectator objects 44) within the virtual three-dimensional space 40 is displayed on the game screen in a larger size than in a case where all of the outside-screen judgment reference points 72 whose coordinates are transformed into those in the screen coordinate system are included in the game screen display subject region (FIG. 7(*b*)).

Accordingly, to execute the predetermined game processing, based on a judgment result as to whether or not the region of interest within the virtual three-dimensional space 40 is displayed on the game screen in a size equal to or larger than a given reference size, a plurality of outside-screen judgment reference points 72 may be set as follows. For example, the plurality of outside-screen judgment reference points 72 may be set so that the coordinate values in the screen coordinate system of at least one of the outside-screen judgment reference points 72 are included in the region outside the game screen display subject region in the case where the region of interest is displayed on the game screen in a size equal to or larger than the reference size. This allows the judgment as to whether or not the region of interest is displayed on the game screen in a size equal to or larger than the reference size by relatively simple processing of judging whether or not the coordinate values in the screen coordinate system of at least one of the outside-screen judgment reference points 72 are included in the region outside the game screen display subject region.

Note that the plurality of outside-screen judgment reference points 72 may be set so that the coordinate values in the screen coordinate system of all of the outside-screen judgment reference points 72 are included in the region outside the game screen display subject region in a case where the region of interest is displayed on the game screen in a size equal to or larger than the reference size. Alternatively, the plurality of outside-screen judgment reference points 72 may be set so that the coordinate values in the screen coordinate system of a predetermined number or more or a predetermined percentage or more of the outside-screen judgment reference points 72 are included in the region outside the game screen display subject region in a case where the region of interest is displayed on the game screen in a size equal to or larger than the reference size.

Further, in this case, similarly to the inside-screen judgment reference points 70, the number and the positions of the outside-screen judgment reference points 72 are set in consideration of, for example, which direction the scene of the region of interest is to be viewed from so as to be displayed on the game screen. Further, similarly to the inside-screen judgment reference points 70, there is a case where one outside-screen judgment reference point 72 suffices by being set in relation to the region of interest within the virtual three-dimensional space 40.

Further, for example, the judging unit 60 judges whether or not the coordinate values in the screen coordinate system of at least one of the inside-screen judgment reference points 70 (for example, all of the inside-screen judgment reference points 70 or a predetermined number or more or a predetermined percentage or more of the inside-screen judgment reference points 70) are included in the game screen display subject region and the coordinate values in the screen coordinate system of at least one of the outside-screen judgment reference points 72 (for example, all of the outside-screen judgment reference points 72 or a predetermined number or more or a predetermined percentage or more of the outside-screen judgment reference points 72) are included in the region outside the game screen display subject region.

For example, if a plurality of inside-screen judgment reference points 70 and a plurality of outside-screen judgment reference points 72 are set as shown in FIG. 4, as shown in FIG. 8, in a case where at least one of the inside-screen judgment reference points 70 whose coordinates are transformed into the screen coordinate system are included in the game screen display subject region (FIG. 8(*a*)), the region of interest (spectator objects 44) within the virtual three-dimensional space 40 is displayed on the game screen in a smaller size than in a case where all of the inside-screen judgment reference points 70 whose coordinates are transformed into those in the screen coordinate system are included in the region outside the game screen display subject region (FIG. 8(*b*)). In addition, in a case where at least one of the outside-screen judgment reference points 72 whose coordinates are transformed into the screen coordinate system are included in the region outside the game screen display subject region (FIG. 8(*a*)), the region of interest (spectator objects 44) within the virtual three-dimensional space 40 is displayed on the game screen in a larger size than in a case where all of the outside-screen judgment reference points 72 whose coordinates are transformed into those in the screen coordinate system are included in the game screen display subject region (FIG. 8(*c*)).

Accordingly, to execute the predetermined game processing, based on a judgment result as to whether or not the region of interest within the virtual three-dimensional space 40 is displayed on the game screen in a size equal to or larger than a given first reference size and equal to or smaller than a given second reference size (size within a given reference range), a plurality of inside-screen judgment reference points 70 and a plurality of outside-screen judgment reference points 72 may be set as follows. For example, the plurality of outside-screen judgment reference points 72 may be set so that the coordinate values in the screen coordinate system of at least one of the outside-screen judgment reference points 72 are included in the region outside the game screen display subject region in the case where the region of interest is displayed on the game screen in a size equal to or larger than the first reference size. In addition, the plurality of inside-screen judgment reference points 70 may be set so that the coordinate values in the screen coordinate system of at least one of the inside-screen judgment reference points 70 are included in the game screen display subject region in the case where the region of interest is displayed on the game screen in a size equal to or smaller than the second reference size. This allows the judgment as to whether or not the region of interest is displayed on the game screen in a size equal to or larger than the first reference size and equal to or smaller than the second reference size by relatively simple processing of "judging whether or not the coordinate values in the screen coordinate system of at least one of the inside-screen judgment reference points 70 are included in the game screen display subject region and the coordinate values in the screen coordinate system of at least one of the outside-screen judgment reference points 72 are included in the region outside the game screen display subject region."

Note that the plurality of inside-screen judgment reference points 70 may be set so that the coordinate values in the screen coordinate system of all of the inside-screen judgment reference points 70 are included in the game screen display subject region in a case where the region of interest is displayed on the game screen in a size equal to or smaller than the second reference size. Alternatively, the plurality of inside-screen judgment reference points 70 may be set so that the coordinate values in the screen coordinate system of a predetermined number or more or a predetermined percentage or more of the inside-screen judgment reference points 70 are included in the game screen display subject region in a case where the region of interest is displayed on the game screen in a size equal to or smaller than the second reference size. In addition, the plurality of outside-screen judgment reference points 72 may be set so that the coordinate values in the screen coordinate system of all of the outside-screen judgment reference points 72 are included in the region outside the game screen display subject region in a case where the region of interest is displayed on the game screen in a size equal to or larger than the first reference size. Alternatively, the plurality of outside-screen judgment reference points 72 may be set so that the coordinate values in the screen coordinate system of a predetermined number or more or a predetermined percentage or more of the outside-screen judgment reference points 72 are included in the region outside the game screen display subject region in a case where the region of interest is displayed on the game screen in a size equal to or larger than the first reference size.

Also in this case, similarly to the above description, the number and the positions of the inside-screen judgment reference points 70 and the outside-screen judgment reference points 72 are set in consideration of, for example, which direction the scene of the region of interest is to be viewed from so as to be displayed on the game screen. Further, similarly to the above description, there is a case where one inside-screen judgment reference point 70 and one outside-screen judgment reference point 72 suffice by being set in relation to the region of interest within the virtual three-dimensional space 40.

Note that the description has been made herein of the case where the reference points (inside-screen judgment reference point 70 and outside-screen judgment reference point 72) are used for judging whether or not the region of interest within the virtual three-dimensional space 40 is displayed on the game screen in a given size. However, the reference points may also be used in a case of, for example, judging whether or not the region of interest within the virtual three-dimensional space 40 is displayed in a given partial region within the game screen. To be more specific, one or more reference points are set on the periphery of the region of interest within the virtual three-dimensional space 40. It is judged whether or not the coordinate values in the screen coordinate system of the reference points are included in the partial region (right half of the game screen) within the game screen. This allows the judgment as to whether or not the region of interest within the virtual three-dimensional space 40 is displayed in a partial region (for example, right half of the game screen) within a display region of the game screen by a relatively simple processing.

(Game Processing Executing Unit)

The game processing executing unit 62 is implemented mainly by the microprocessor 14. The game processing executing unit 62 executes predetermined game processing based on the coordinate values acquired by the coordinate value acquiring unit 58. The term "predetermined game processing" represents, for example, game processing relating to the region of interest within the virtual three-dimensional space 40, to be more specific, processing of performing a sound output relating to the region of interest, processing of performing a display output relating to the region of interest, or the like. In the case of this embodiment, the game processing executing unit 62 executes the processing of causing the speaker 22 to output a play-by-play voice relating to the region of interest. In the case of this embodiment, the game processing executing unit 62 starts the predetermined game processing based on a judgment result of the judging unit 60.

Figure 9:
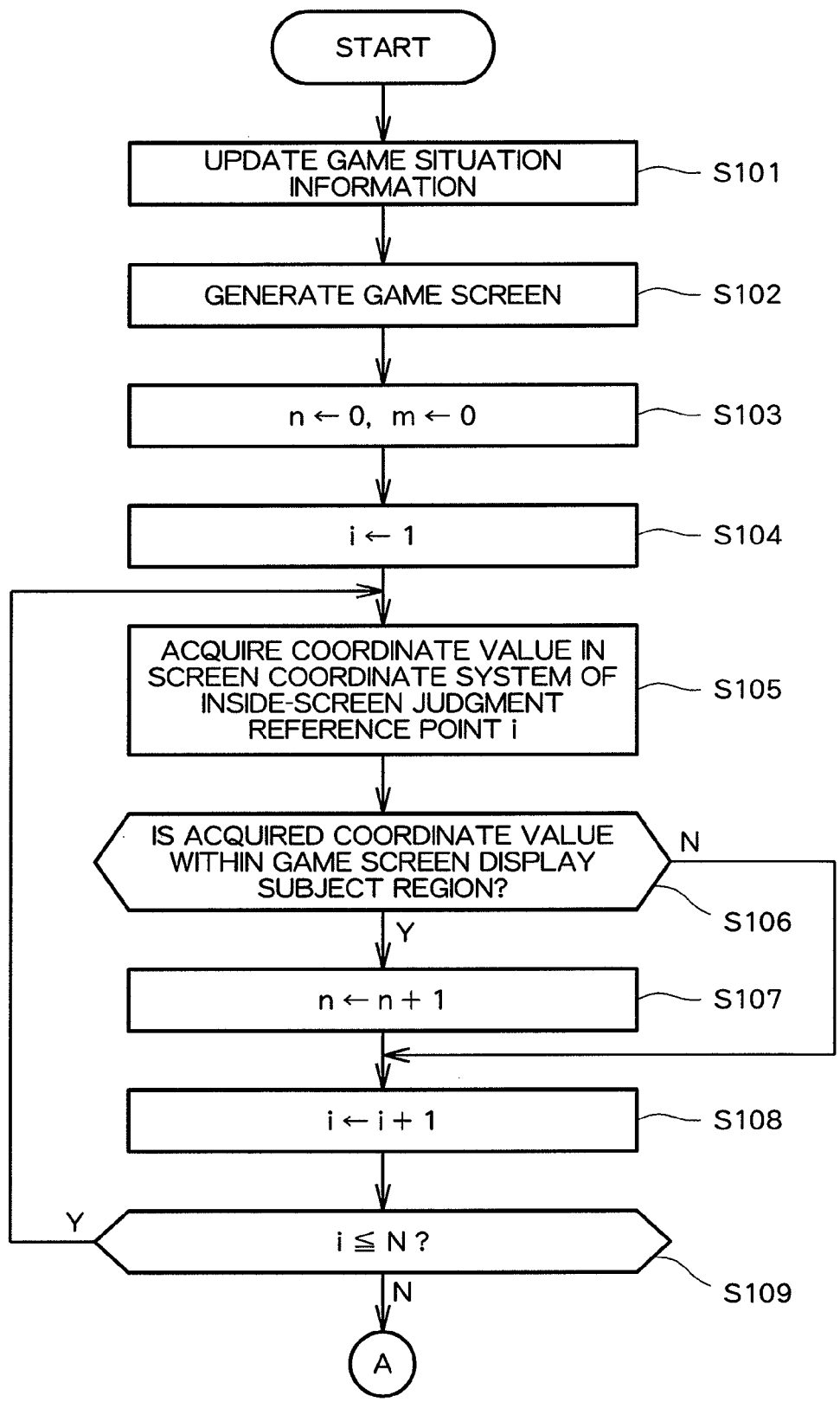
FIG. 9 is a flowchart showing processing executed on the game machine.
Figure 10:
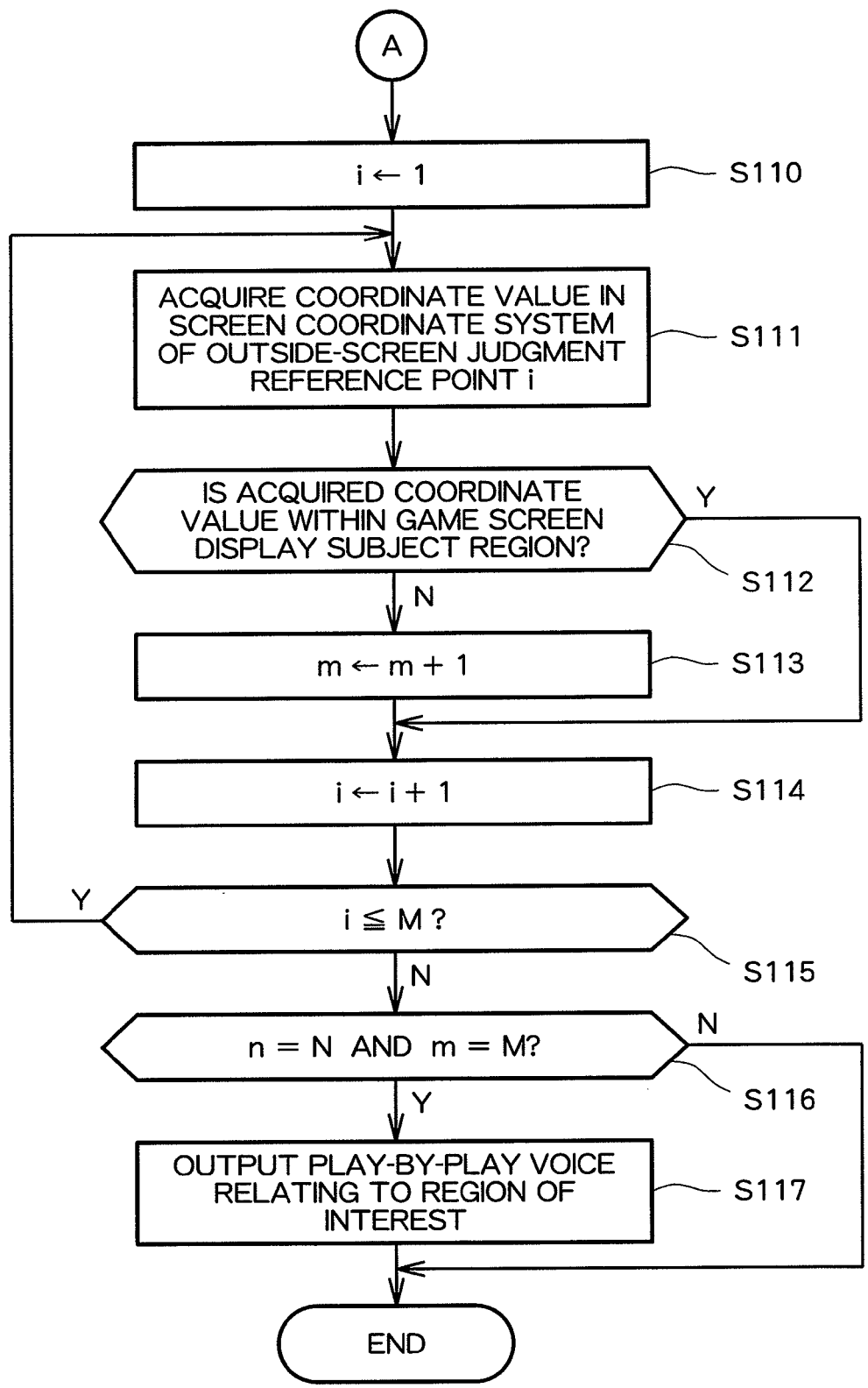
FIG. 10 is a flowchart showing the processing executed on the game machine.

Next, description will given made of processing executed on the game machine 10. FIGS. 9 and 10 are flowcharts mainly showing the processing executed on the game machine 10 every predetermined time (for example, $\frac{1}{60}^{th}$ of a second), which relates to the present invention. The processing is implemented by the microprocessor 14 executing a program read out from the DVD-ROM 25. Note that in the figure, the "inside-screen judgment reference point i" represents the inside-screen judgment reference point 70 assigned an ID "i", and the "outside-screen judgment reference point i" represents the outside-screen judgment reference point 72 assigned the ID "i". Further, any one of the processing of Step S102 and the processing of Steps S103 to S117 may be executed first.

Further, the processing shown in the figure is processing performed in a case of executing the predetermined game processing based on the judgment result as to whether or not the region of interest within the virtual three-dimensional space 40 is displayed on the game screen in a size equal to or larger than a given first reference size and equal to or smaller than a given second reference size (size within a given reference range). Further, herein, a plurality of inside-screen judgment reference points 70 are set so that the coordinate values in the screen coordinate system of all of the inside-screen judgment reference points 70 are included in the game screen display subject region in a case where the region of interest within the virtual three-dimensional space 40 is displayed on the game screen in a size equal to or smaller than the given second reference size. Further, herein, a plurality of outside-screen judgment reference points 72 are set so that the coordinate values in the screen coordinate system of all of the outside-screen judgment reference points 72 are included in the region outside the game screen display subject region in a case where the region of interest within the virtual three-dimensional space 40 is displayed on the game screen in a size equal to or larger than the given first reference size. In other words, in the processing shown in the figure, the judging unit 60 judges whether or not the coordinate values in the screen coordinate system of all of the inside-screen judgment reference points 70 are included in the game screen display subject region and the coordinate values in the screen coordinate system of all of the outside-screen judgment reference points 72 are included in the region outside the game screen display subject region. Further, the game processing executing unit 62 executes the predetermined game processing (processing of outputting a play-by-play voice relating to the region of interest) if it is judged that the coordinate values in the screen coordinate system of all of the inside-screen judgment reference points 70 are included in the game screen display subject region and the coordinate values in the screen coordinate system of all of the outside-screen judgment reference points 72 are included in the region outside the game screen display subject region.

As shown in FIG. 9, the game situation information stored in the game situation information storage unit 50 is updated (S101). For example, the state of the operation subject player object is updated based on the operation content of the controller 32. Further, for example, the state (position, posture, and angle of view) of the virtual camera 46 is updated based on the position of the operation subject player object or the ball object.

Subsequently, the game screen display control unit 52 creates a game screen in the VRAM (S102). The game screen display control unit 52 generates in the VRAM the game screen showing a picture obtained by viewing, from the virtual camera 46, the virtual three-dimensional space 40 by using the predetermined coordinate transformation calculation to transform the coordinates of an object placed in the virtual three-dimensional space 40 from the world coordinate system into the screen coordinate system. To be more specific, the game screen display control unit 52 executes geometric processing to transform the coordinates from the world coordinate system (XW, YW, ZW) into a viewpoint coordinate system. Herein, the viewpoint coordinate system represents a coordinate system in which the position (viewpoint position) of the virtual camera 46 is set as the origin, and the front direction (viewing direction) of the virtual camera 46 is set as a ZW axis direction. Further, the game screen display control unit 52 further performs clipping processing. The game screen display control unit 52 then generates the game screen in the VRAM by transforming the coordinates of each object within a range of field of view from the viewpoint coordinate system into the screen coordinate system (XS, YS). As described above, a rectangle region (game screen display subject region) surrounded by the 4 points in the screen coordinate system, (XS0, YS0), (XS0+W, YS0), (XS0, YS0+H), and (XS0+W, YS0+H), is displayed on the game screen.

Subsequently, variables n and m are initialized to "0" (S103). The variable n is used for counting the number of the inside-screen judgment reference points 70 judged to have coordinate values in the screen coordinate system included in the game screen display subject region among the inside-screen judgment reference points 70 set in relation to the region of interest within the virtual three-dimensional space 40. In a similar manner, the variable m is used for counting the number of the outside-screen judgment reference points 72 judged to have coordinate values in the screen coordinate system excluded from the game screen display subject region among the outside-screen judgment reference points 72 set in relation to the region of interest within the virtual three-dimensional space 40.

Subsequently, a variable i is initialized to "1" (S104). The coordinate value acquiring unit 58 then acquires the coordinate value in the screen coordinate system of the inside-screen judgment reference point i (S105). The coordinate value is obtained by transforming the coordinate value of the inside-screen judgment reference point i stored in the reference point storage unit 56 into the screen coordinate system by using the coordinate transformation calculation which is used in Step S102 for transforming the coordinates of the object from the world coordinate system into the screen coordinate system.

Subsequently, the judging unit 60 judges whether or not the coordinate value acquired in Step S105 is included in the game screen display subject region (S106). In other words, the judging unit 60 judges whether or not the coordinate value acquired in Step S105 is included in the rectangle region surrounded by the 4 points in the screen coordinate system, (XS0, YS0), (XS0+W, YS0), (XS0, YS0+H), and (XS0+W, YS0+H). If it is judged that the coordinate value acquired in Step S105 is included in the game screen display subject region, the judging unit 60 increments the variable n (S107).

After the processing of Step S107 has been executed, or if it is judged in Step S106 that the coordinate value acquired in Step S105 is not included in the game screen display subject region, the variable i is incremented (S108). Then, it is judged whether or not the value of the variable i is equal to or less than N (S109). Herein, N is a constant representing the number of the inside-screen judgment reference points 70 set in relation to the region of interest within the virtual three-dimensional space 40. If the value of the variable i is equal to or less than N, the processing of Steps S105 to S109 is executed again.

On the other hand, if the value of the variable i is not equal to or less than N, the variable i is initialized to "1" (S110). The coordinate value acquiring unit 58 then acquires the coordinate value in the screen coordinate system of the outside-screen judgment reference point i (S111). In a similar manner as the processing of Step S105, the coordinate value is obtained by transforming the coordinate value of the outside-screen judgment reference point stored in the reference point storage unit 56 into the screen coordinate system by using the coordinate transformation calculation which is used in Step S102 for transforming the coordinates of the object from the world coordinate system into the screen coordinate system.

Subsequently, the judging unit 60 judges whether or not the coordinate value acquired in Step S111 is included in the game screen display subject region (S112). If it is judged that the coordinate value acquired in Step S111 is not included in the game screen display subject region, the judging unit 60 increments the variable m (S113).

After the processing of Step S113 has been executed, or if it is judged in Step S112 that the coordinate value acquired in Step S111 is included in the game screen display subject region, the variable i is incremented (S114). Then, it is judged whether or not the value of the variable i is equal to or less than M (S115). Herein, M is a constant representing the number of the outside-screen judgment reference points 72 set in relation to the region of interest within the virtual three-dimensional space 40. If the value of the variable i is equal to or less than M, the processing of Steps S111 to S115 is executed again.

On the other hand, if the value of the variable i is not equal to or less than M, the judging unit 60 judges whether or not the value of the variable n is N and the value of the variable m is M (S116). In other words, the judging unit 60 judges whether or not the coordinate values in the screen coordinate system of all of the inside-screen judgment reference points 70 are included in the game screen display subject region and the coordinate values in the screen coordinate system of all of the outside-screen judgment reference points 72 are included in the region outside the game screen display subject region. If the value of the variable n is N and the value of the variable m is M, the game processing executing unit 62 reads out play-by-play voice data associated with the region of interest from the DVD-ROM 25, and starts the output of a play-by-play voice based on the play-by-play voice data (S117).

As described above, on the game machine 10, one or more reference points relating to the region of interest within the virtual three-dimensional space 40 are set so that at least one reference point is included in a predetermined region in the screen coordinate system in a case where the region of interest is displayed on the game screen in a given mode (for example, size, display position, or the like). Then, the judgment as to whether or not the region of interest within the virtual three-dimensional space 40 is displayed on the game screen in the given mode can be realized by relatively simple processing of judging whether or not at least one reference point is included in a predetermined region in the screen coordinate system. According to the game machine 10, it is possible to realize, with relatively simple processing to judge whether or not the region of interest within the virtual three-dimensional space 40 is displayed on the game screen in a predetermined state, and execute the predetermined game processing based on the judgment result.

Note that the present invention is not limited to the embodiment described above.

For example, in the processing shown in FIGS. 9 and 10, the game processing executing unit 62 may start reproduction of the play-by-play voice relating to the region of interest in a case where a state in which the coordinate values in the screen coordinate system of all of the inside-screen judgment reference points 70 are included in the game screen display subject region, and the coordinate values in the screen coordinate system of all of the outside-screen judgment reference points 72 are included in the region outside the game screen display subject region (in other words, a state in which it is judged in Step S116 that the value of the variable n is N and the value of the variable m is M) continues over a predetermined period. This allows such a configuration that does not execute the predetermined game processing (reproduction of the play-by-play voice relating to the region of interest) in a case where the region of interest within the virtual three-dimensional space 40 is instantaneously displayed on the game screen in a given mode.

Further, for example, it may be possible to set 2 reference points in relation to the region of interest within the virtual three-dimensional space 40 and judge whether or not the region of interest is displayed on the game screen in a given size based on a distance between the reference points whose coordinates are transformed into those in the screen coordinate system. Alternatively, for example, it may be possible to set 3 reference points in relation to the region of interest within the virtual three-dimensional space 40 and judge whether or not the region of interest is displayed on the game screen in a given size based on an area of the region surrounded by the reference points whose coordinates are transformed into those in the screen coordinate system. As described above, there is a case where it can be judged whether or not the region of interest within the virtual three-dimensional space 40 is displayed on the game screen in a given mode by a method other than judging whether or not the reference point whose coordinates are transformed into those in the screen coordinate system is included in the predetermined region in the screen coordinate system.

Further, for example, the present invention can be applied to various games. Further, for example, the present invention can be applied to such a game system as to display a game advertisement on the game screen and calculate an advertisement point (for example, point based on which a sponsor of the advertisement is charged) based on how the game advertisement is displayed (for example, the size, the position on the game screen, and the like).

Further, for example, the program may be delivered to a household or the like via a communication network unlike the above description in which the program is supplied to the household game machine 11 from the DVD-ROM 25 serving as the information storage medium. FIG. 11 is a diagram showing an entire configuration of a program delivery system using a communication network. Description will be made of the program delivery method according to the present invention with reference to the figure. As shown in the figure, this program delivery system 100 includes a game database 102, a server 104, a communication network 106, a personal computer 108, a household game machine 110, and a PDA (personal digital assistant) 112. Of those, the game database 102 and the server 104 constitute a program delivery device 114. The communication network 106 includes, for example, the Internet and a cable television network. In this system, the same program as the storage content of the DVD-ROM 25 is stored in the game database (information storage medium) 102. A user uses the personal computer 108, the household game machine 110, the PDA 112, or the like to make a game delivery request, so the game delivery request is transferred to the server 104 via the communication network 106. Then, the server 104 reads out the program from the game database 102 according to the game delivery request, and transmits the program to such a game delivery request source as the personal computer 108, the household game machine 110, or the PDA 112. The game delivery is performed herein according to the game delivery request, but the server 104 may unilaterally transmit the program. In addition, a whole necessary program is not necessarily delivered at one time (batch delivery), and necessary parts may be delivered (split delivery) depending on which phase the game is in. By thus performing the game delivery via the communication network 106, the user can obtain the program with ease.

The invention claimed is:

1. A game machine, which generates and displays a game screen showing a scene of a virtual three-dimensional space viewed from a given viewpoint by transforming coordinates of an object placed in the virtual three-dimensional space into a screen coordinate system by using a predetermined coordinate transformation calculation, comprising:
   a reference point storage unit that stores coordinate values within the virtual three-dimensional space of a set of inside-screen reference points and a set of outside-screen reference points that are set in relation to a region of interest within the virtual three-dimensional space;
   a coordinate value acquiring unit that acquires coordinate values in the screen coordinate system of the set of inside-screen reference points and the set of outside-screen reference points by transforming the coordinate values of the set of inside-screen reference points and the set of outside-screen reference points stored in the reference point storage means into the screen coordinate system by using the predetermined coordinate transformation calculation; and
   game processing execution unit that executes predetermined game processing based on the coordinate values acquired by the coordinate value acquiring unit.

2. A game machine according to claim 1, further comprising a judging unit that judges whether or not the coordinate values in the screen coordinate system of at least one of the set of inside-screen reference points and the set of outside-screen reference points are included in a predetermined region in the screen coordinate system, to provide an indication of relative size with respect to a reference size,
   wherein the game processing executing unit executes the predetermined game processing based on a judgment result of the judging unit.

3. A game machine according to claim 2, wherein:
   the judging unit judges whether or not the coordinate values in the screen coordinate system of at least one of the set of inside-screen reference points are included in the predetermined region and the coordinate values in the screen coordinate system of at least one of the set of outside-screen reference points are included in a region outside the predetermined region.

4. A control method for a game machine which generates and displays a game screen showing a scene of a virtual three-dimensional space viewed from a given viewpoint by transforming coordinates of an object placed in the virtual three-dimensional space into a screen coordinate system by using a predetermined coordinate transformation calculation, the control method comprising:
   acquiring coordinate values in the screen coordinate system of a set of inside-screen reference points and a set of outside-screen reference points by transforming the coordinate values of the set of inside-screen reference points and the set of outside-screen reference points stored in reference point storage means into the screen coordinate system by using the predetermined coordinate transformation calculation, the reference point storage means being configured to store coordinate values within the virtual three-dimensional space of the set of inside-screen reference points and the set of outside-screen reference points set in relation to a region of interest within the virtual three-dimensional space; and
   executing predetermined game processing based on the coordinate values acquired in the acquiring.

5. A non-transitory computer-readable information storage medium recorded with a program for causing a computer to function as a game machine which generates and displays a game screen showing a scene of a virtual three-dimensional space viewed from a given viewpoint by transforming coordinates of an object placed in the virtual three-dimensional space into a screen coordinate system by using a predetermined coordinate transformation calculation,
   the program further causing the computer to function as:
   reference point storage means for storing coordinate values within the virtual three-dimensional space of a set of inside-screen reference points and a set of outside-screen reference points that are set in relation to a region of interest within the virtual three-dimensional space;
   acquiring means for acquiring coordinate values in the screen coordinate system of the set of inside-screen reference points and the set of outside-screen reference points by transforming the coordinate values of the set of inside-screen reference points and the set of outside-screen reference points stored in the reference point storage means into the screen coordinate system by using the predetermined coordinate transformation calculation; and
   game processing executing means for executing predetermined game processing based on the coordinate values acquired by the acquiring means.

6. The game machine of claim 1, wherein the game screen generates an output indicative of a soccer game event.

7. The control method of claim 4, wherein the game screen generates an output indicative of a soccer game event.

8. The non-transitory computer-readable medium of claim 5, wherein the game screen generates an output indicative of a soccer game event.

9. The control method of claim 4, further comprising:
   judging whether the coordinate values in the screen coordinate system of at least one of the set of inside-screen reference points and the set of outside-screen reference points are included in a predetermined region in the screen coordinate system, to provide an indication of relative size with respect to a reference size,
   wherein the executing executes the predetermined game processing based on a judgment result of the judging.

10. The non-transitory computer readable medium of claim 5, further comprising judging means for judging whether or not the coordinate values in the screen coordinate system of at least one of the set of inside-screen reference points and the set of outside-screen reference points are included in a predetermined region in the screen coordinate system, to provide an indication of relative size with respect to a reference size,
    wherein the game processing executing means executes the predetermined game processing based on a judgment result of the judging means.

* * * * *